US012142446B2

(12) United States Patent
Zhang et al.

(10) Patent No.: US 12,142,446 B2
(45) Date of Patent: Nov. 12, 2024

(54) AUXILIARY CONTACT SYSTEM OF CONTACTOR

(71) Applicant: Tyco Electronics (Shenzhen) Co. Ltd., Shenzhen (CN)

(72) Inventors: Xiaoning Zhang, Shenzhen (CN); Teng Zou, Shenzhen (CN)

(73) Assignee: Tyco Electronics (Shenzhen) Co., Ltd., Shenzhen (CN)

( * ) Notice: Subject to any disclaimer, the term of this patent is extended or adjusted under 35 U.S.C. 154(b) by 183 days.

(21) Appl. No.: 17/841,997

(22) Filed: Jun. 16, 2022

(65) Prior Publication Data

US 2022/0310341 A1 Sep. 29, 2022

Related U.S. Application Data

(63) Continuation of application No. PCT/EP2020/086156, filed on Dec. 15, 2020.

(30) Foreign Application Priority Data

Dec. 17, 2019 (CN) ......................... 201922266990.4

(51) Int. Cl.
*H01H 50/24* (2006.01)

(52) U.S. Cl.
CPC .................................. *H01H 50/24* (2013.01)

(58) Field of Classification Search
CPC .... H01H 50/24; H01H 50/546; H01H 50/643; H01H 1/2041; H01H 50/54; H01H 50/541
See application file for complete search history.

(56) References Cited

U.S. PATENT DOCUMENTS 4,645,886 A * 2/1987 Williams ............... H01H 3/001 200/DIG. 42
4,663,502 A * 5/1987 Kane .................... H01H 50/545 335/198

(Continued)

FOREIGN PATENT DOCUMENTS

CN 2609162 Y 3/2004
DE 9309215 U1 10/1994

(Continued)

OTHER PUBLICATIONS

Machine translation of CN 2609162 Y (Year: 2004).*
PCT Search Report and Written Opinion, Application No. PCT/EP2020/086156, Dated: Apr. 1, 2021, 30 pages.

*Primary Examiner* — Bernard Rojas
(74) *Attorney, Agent, or Firm* — Barley Snyder

(57) ABSTRACT

An auxiliary contact system of a contactor includes an auxiliary movable contact, an auxiliary static contact corresponding to the auxiliary movable contact, and a rotation member configured to be rotatable between a first position and a second position. In the first position, a main movable contact of the contactor is driven by the rotation member to an electric contact position in which the main movable contact contacts a main static contact and the auxiliary movable contact is in the electric contact position contacting the auxiliary static contact. In the second position, the main movable contact of the contactor is driven by the rotation member to an electric separation position where the main movable contact is separated from the main static contact and the rotation member pushes the auxiliary movable contact to the electric separation position separated from the auxiliary static contact.

20 Claims, 4 Drawing Sheets

(56) References Cited

U.S. PATENT DOCUMENTS

| | | | | |
|---|---|---|---|---|
| 2012/0206222 | A1* | 8/2012 | Gruner | H01H 51/2263 335/177 |
| 2023/0420206 | A1* | 12/2023 | Chen | H01H 50/546 |

FOREIGN PATENT DOCUMENTS

| | | | |
|---|---|---|---|
| JP | S61151943 | A | 7/1986 |
| WO | 2019201735 | A1 | 10/2019 |

* cited by examiner

AUXILIARY CONTACT SYSTEM OF CONTACTOR

CROSS-REFERENCE TO RELATED APPLICATIONS

This application is a continuation of PCT International Application No. PCT/EP2020/086156, filed on Dec. 15, 2020, which claims priority under 35 U.S.C. § 119 to Chinese Patent Application No. 201922266990.4, filed on Dec. 17, 2019.

FIELD OF THE INVENTION

Embodiments of the disclosure relates to an auxiliary contact system of a contactor.

BACKGROUND

A contactor is a kind of control electrical appliance. The action of the main circuit contacts (comprising a main movable contact and a main static contact) can be controlled through the coil electromagnetic system, so as to realize the connection and disconnection of the main circuit. At the same time, the contactor usually comprises additional auxiliary contacts (comprising an auxiliary movable contact and an auxiliary static contact), which play the role of connecting an auxiliary circuit to indicate that the main circuit is in the on or off state. In the prior art, the auxiliary contacts are usually purchased auxiliary switches, which have complex structure and high cost.

SUMMARY

An auxiliary contact system of a contactor includes an auxiliary movable contact, an auxiliary static contact corresponding to the auxiliary movable contact, and a rotation member configured to be rotatable between a first position and a second position. In the first position, a main movable contact of the contactor is driven by the rotation member to an electric contact position in which the main movable contact contacts a main static contact and the auxiliary movable contact is in the electric contact position contacting the auxiliary static contact. In the second position, the main movable contact of the contactor is driven by the rotation member to an electric separation position where the main movable contact is separated from the main static contact and the rotation member pushes the auxiliary movable contact to the electric separation position separated from the auxiliary static contact.

BRIEF DESCRIPTION OF THE DRAWINGS

The invention will now be described by way of example with reference to the accompanying Figures, of which.

DETAILED DESCRIPTION OF THE EMBODIMENTS

Figure 1:
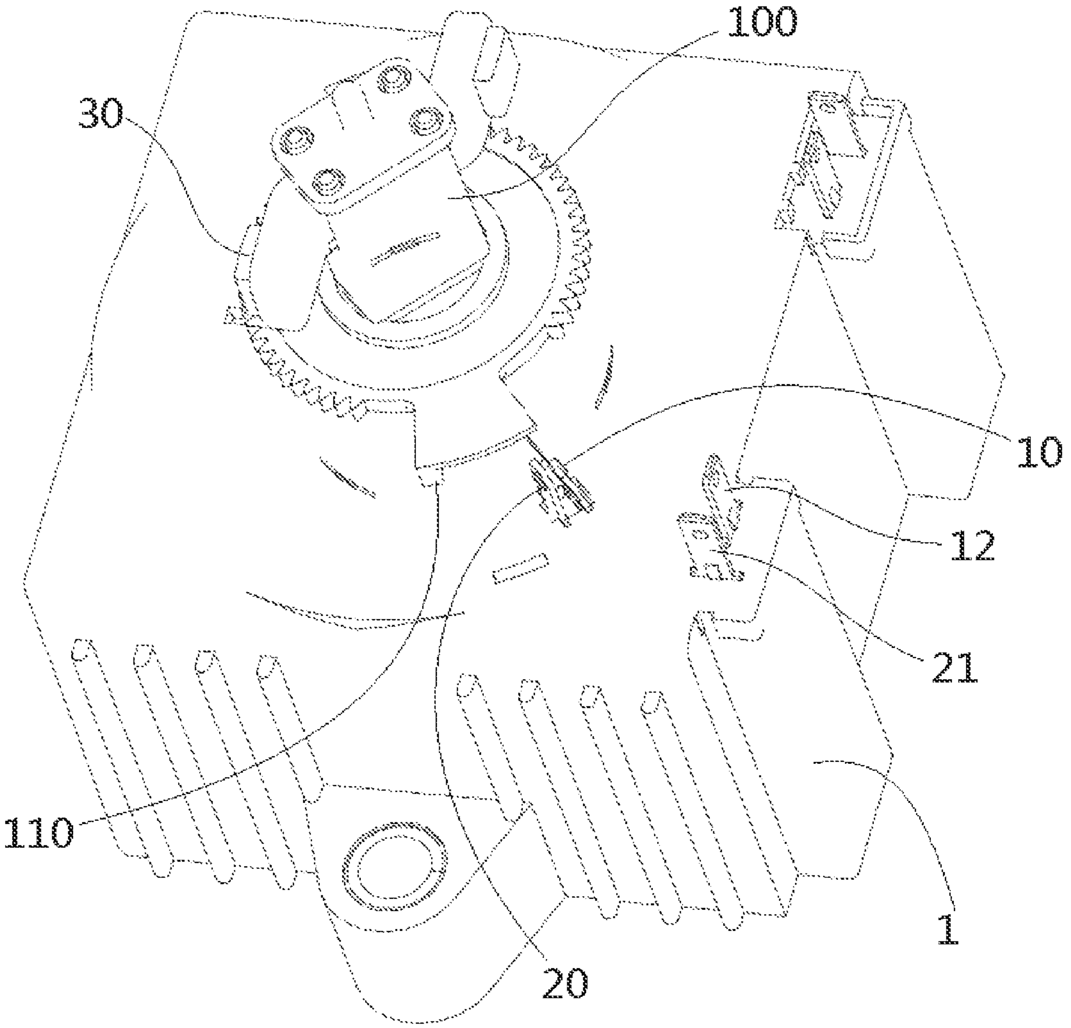
FIG. 1 is a perspective view of an auxiliary contact system of a contactor according to an exemplary embodiment of the present disclosure, wherein an auxiliary movable contact is in an electric contact position contacting an auxiliary static contact.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown to simplify the drawing.

FIG. 1 shows a schematic view of an auxiliary contact system of a contactor according to an exemplary embodiment of the present disclosure, wherein the auxiliary movable contact 10 is in an electric contact position where the auxiliary movable contact 10 contacts the auxiliary static contact 20.

As shown in FIG. 1, in the illustrated embodiment, the auxiliary contact system of a contactor mainly comprises an auxiliary movable contact 10, an auxiliary static contact 20, and a rotation member 100. The auxiliary static contact 20 corresponds to the auxiliary movable contact 10.

Figure 2:
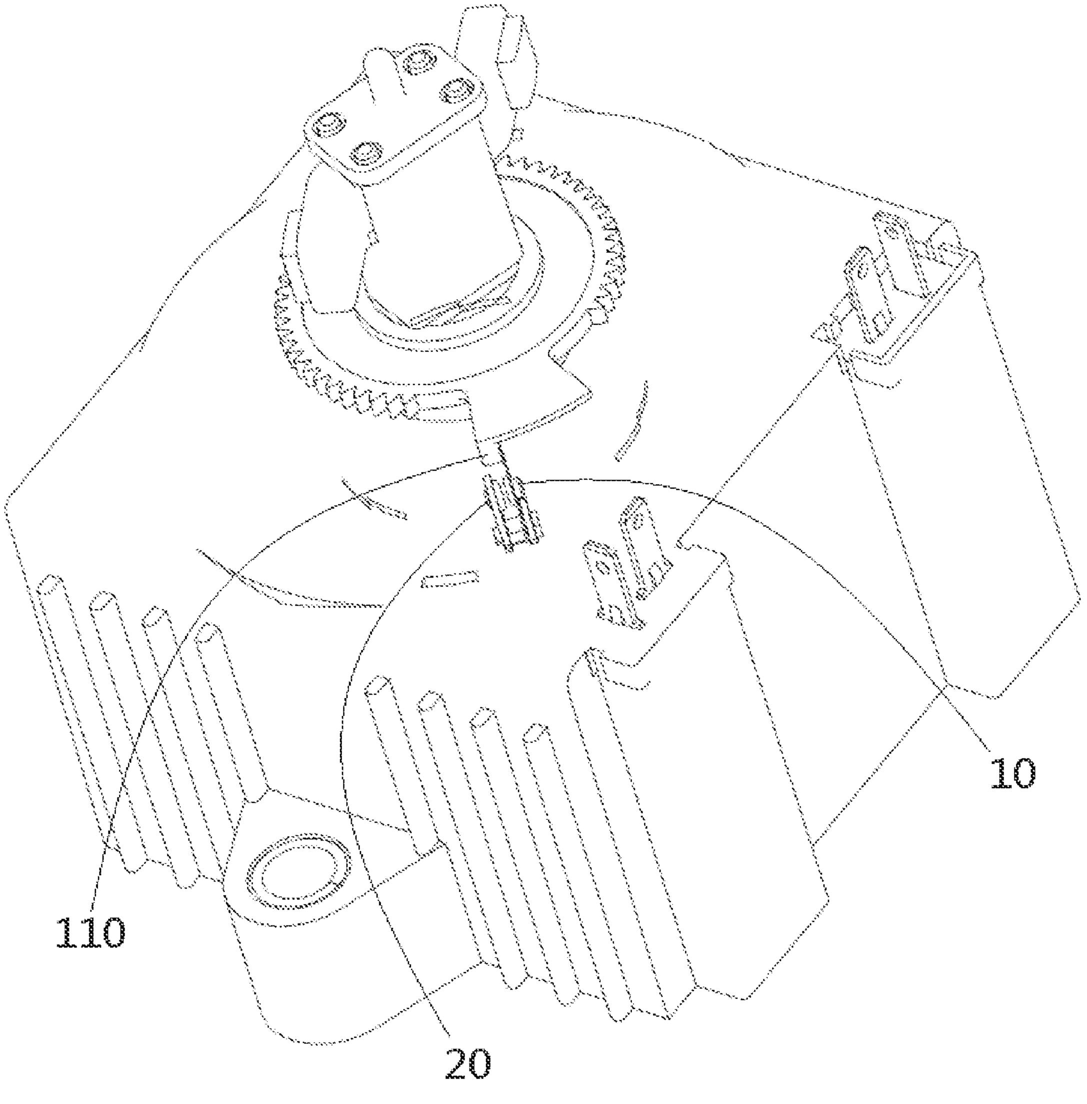
FIG. 2 is a perspective view of the auxiliary contact system, wherein the auxiliary movable contact is in an electric separation position separated from the auxiliary static contact.

FIG. 2 shows a schematic view of an auxiliary contact system of a contactor according to an exemplary embodiment of the present disclosure, wherein the auxiliary movable contact 10 is in an electric separation position where the auxiliary movable contact 10 is separated from the auxiliary static contact 20.

As shown in FIGS. 1 and 2, in the illustrated embodiment, the rotation member 100 is configured to be rotatable between a first position (the position shown in FIG. 1) and a second position (the position shown in FIG. 2).

As shown in FIG. 1, in the illustrated embodiment, when the rotation member 100 is rotated to the first position, the rotation member 100 drives a main movable contact 30 of the contactor to an electric contact position where the main movable contact 30 contacts a main static contact of the contactor.

As shown in FIG. 2, in the illustrated embodiment, when the rotation member 100 is rotated to the second position, the rotation member 100 drives the main movable contact 30 of the contactor to an electric separation position where the main movable contact 30 is separated from the main static contact of the contactor.

As shown in FIG. 1, in the illustrated embodiment, when the rotation member 100 is in the first position, the auxiliary movable contact 10 is in the electric contact position where the auxiliary movable contact 10 contacts the auxiliary static contact 20.

As shown in FIG. 2, in the illustrated embodiment, when the rotation member 100 is in the second position, the rotation member 100 pushes the auxiliary movable contact 10 to the electric separation position where the auxiliary movable contact 10 is separated from the auxiliary static contact 20.

As shown in FIG. 1, in the illustrated embodiment, when the rotation member 100 is in the first position, the rotation member 100 is configured not to contact the auxiliary movable contact 10, and the auxiliary movable contact 10 is configured to electrically contact the auxiliary static contact 20 by its own elastic deformation force.

As shown in FIG. 2, in the illustrated embodiment, when the rotation member 100 is in the second position, the rotation member 100 is configured to overcome the elastic deformation force of the auxiliary movable contact 10 and push the auxiliary movable contact 10 to the electric separation position where the auxiliary movable contact 10 is separated from the auxiliary static contact 20.

Figure 3:
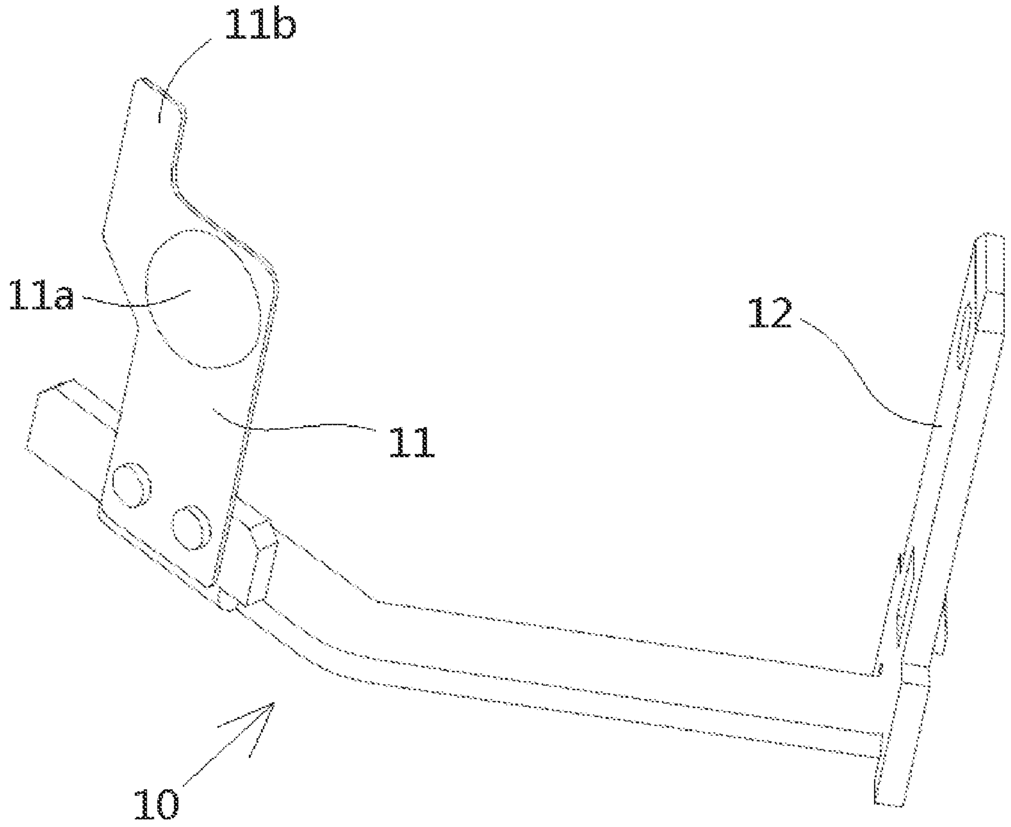
FIG. 3 is a perspective view of the auxiliary movable contact.
Figure 4:
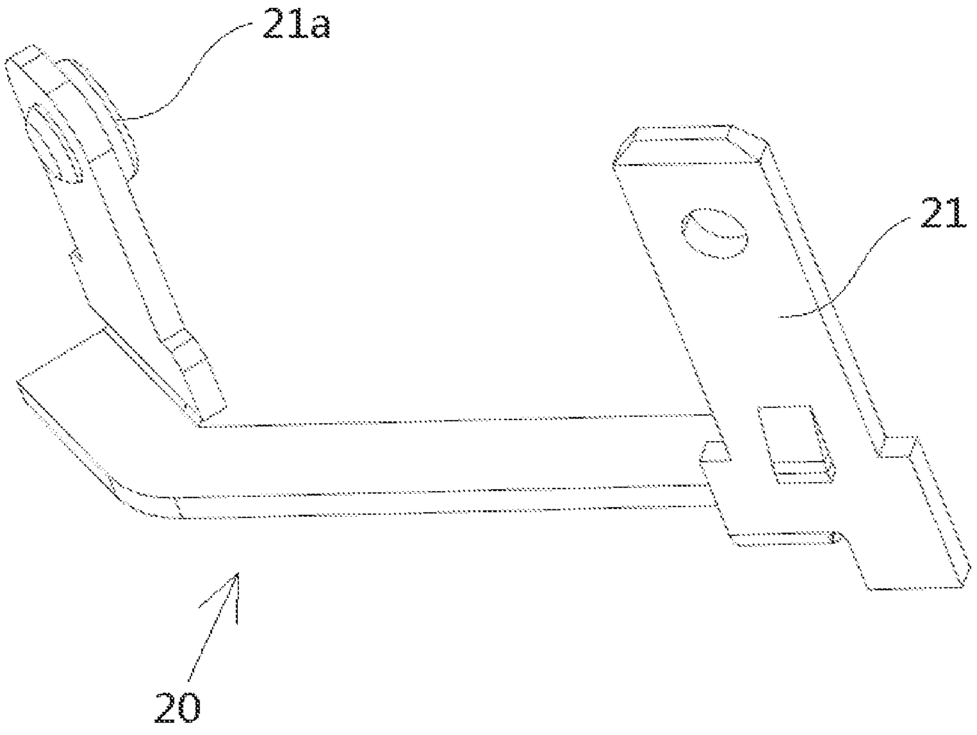
FIG. 4 is a perspective view of the auxiliary static contact.

FIG. 3 shows a schematic perspective view of an auxiliary movable contact 10 of an auxiliary contact system of a contactor according to an exemplary embodiment of the present disclosure. FIG. 4 shows a schematic perspective view of an auxiliary static contact 20 of an auxiliary contact system of a contactor according to an exemplary embodiment of the present disclosure.

As shown in FIGS. 1 to 4, in the illustrated embodiment, the auxiliary movable contact 10 comprises an auxiliary movable elastic sheet 11 and a raised auxiliary movable contact point 11*a* provided on the auxiliary movable elastic sheet 11. The auxiliary static contact 20 comprises an auxiliary static terminal 21 and a raised auxiliary static contact point 21*a* provided on the auxiliary static terminal 21.

As shown in FIGS. 1 to 4, in the illustrated embodiment, when the rotation member 100 is in the first position, the raised auxiliary movable contact point 11*a* of the auxiliary movable contact 10 is configured to electrically contact the raised auxiliary static contact point 21*a* of the auxiliary static contact 20.

As shown in FIGS. 1 to 4, in the illustrated embodiment, when the rotation member 100 is in the first position, the raised auxiliary movable contact point 11*a* is configured to electrically contact the raised auxiliary static contact point 21*a* by the elastic deformation force generated by the auxiliary movable elastic sheet 11.

As shown in FIGS. 1 to 4, in the illustrated embodiment, a pushing portion 110 for pushing the auxiliary movable elastic sheet 11 is formed on the rotation member 100, and an extension portion 11*b* corresponding to the pushing portion 110 is formed on the auxiliary movable elastic sheet 11. During the rotation of the rotation member 100 from the first position to the second position, the pushing portion 110 drives the auxiliary movable elastic sheet 11 to move by pushing the extension portion 11*b*, so as to overcome the elastic deformation force generated by the auxiliary movable elastic sheet 11.

As shown in FIGS. 1 to 4, in the illustrated embodiment, the extension portion 11*b* of the auxiliary movable elastic sheet 11 is configured to extend outwards from the end of the auxiliary movable elastic sheet 11 by a predetermined length to increase an arm length of the auxiliary movable elastic sheet 11.

As shown in FIGS. 1 to 4, in the illustrated embodiment, the raised auxiliary movable contact point 11*a* is configured to a separate member from the auxiliary movable elastic sheet 11 and is riveted to the auxiliary movable elastic sheet 11, and the raised auxiliary static contact point 21*a* is configured to a separate member from the auxiliary static terminal 21 and is riveted to the auxiliary static terminal 21.

As shown in FIGS. 1 to 4, in the illustrated embodiment, the auxiliary movable contact 10 further comprises an auxiliary movable terminal 12, and the auxiliary movable elastic sheet 11 is riveted to the auxiliary movable terminal 12.

As shown in FIGS. 1 to 4, in the illustrated embodiment, the auxiliary movable terminal 12 and the auxiliary static terminal 21 are fixed on an inner wall of a housing 1 of the contactor.

In each of the foregoing exemplary embodiments according to the present disclosure, the synchronous action of the auxiliary movable contact and the main movable contact can be controlled by the rotation member, so no additional auxiliary switch is required, which reduces the manufacturing cost of the contactor. In addition, the auxiliary contact system of the present application has strong anti-interference ability, so as to avoid malfunction and correctly indicate the working state of the main circuit. For example, when the main circuit of the contactor fails and the active contacts cannot be disconnected, the rotation member will not be able to reset normally, the auxiliary movable contact and the auxiliary static contact will be in the on state, and the abnormal working condition alarm will be realized through the feedback of the signal, which can effectively and accurately monitor the working status of the main circuit.

In addition, those areas in which it is believed that those of ordinary skill in the art are familiar, have not been described herein in order not to unnecessarily obscure the invention described. Accordingly, it must be understood that the invention is not to be limited by the specific illustrative embodiments, but only by the scope of the appended claims.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An auxiliary contact system of a contactor, comprising:

an auxiliary movable contact;

an auxiliary static contact corresponding to the auxiliary movable contact; and a rotation member configured to be rotatable between a first position and a second position, in the first position, a main movable contact of the contactor is driven by the rotation member to an electric contact position in which the main movable contact contacts a main static contact and the auxiliary movable contact is in the electric contact position contacting the auxiliary static contact, the auxiliary movable contact electrically contacts the auxiliary static contact by an elastic deformation force of the auxiliary movable contact, and the rotation member does not contact the auxiliary movable contact, and in the second position, the main movable contact of the contactor is driven by the rotation member to an electric separation position where the main movable contact is separated from the main static contact and the rotation member pushes the auxiliary movable contact to the electric separation position separated from the auxiliary static contact.

2. The auxiliary contact system of claim 1, wherein, when the rotation member is in the second position, the rotation member overcomes the elastic deformation force of the auxiliary movable contact and biases the auxiliary movable contact to the electric separation position.

3. The auxiliary contact system of claim 1, wherein the auxiliary movable contact has an auxiliary movable elastic sheet and a raised auxiliary movable contact point disposed on the auxiliary movable elastic sheet.

4. The auxiliary contact system of claim 3, wherein the auxiliary static contact has an auxiliary static terminal and a raised auxiliary static contact point disposed on the auxiliary static terminal.

5. The auxiliary contact system of claim 4, wherein, when the rotation member is in the first position, the raised auxiliary movable contact point electrically contacts the raised auxiliary static contact point.

6. The auxiliary contact system of claim 5, wherein, when the rotation member is in the first position, the raised auxiliary movable contact point electrically contacts the raised auxiliary static contact point by the elastic deformation force generated by the auxiliary movable elastic sheet.

7. The auxiliary contact system of claim 3, wherein the rotation member has a pushing portion pushing the auxiliary movable elastic sheet.

8. The auxiliary contact system of claim 7, wherein the auxiliary movable elastic sheet has an extension portion corresponding to the pushing portion.

9. The auxiliary contact system of claim 8, wherein, during rotation of the rotation member from the first position to the second position, the pushing portion drives the auxiliary movable elastic sheet to move by pushing the extension portion to overcome an elastic deformation force generated by the auxiliary movable elastic sheet.

10. The auxiliary contact system of claim 9, wherein the extension portion extends outward from an end of the auxiliary movable elastic sheet by a predetermined length to increase an arm length of the auxiliary movable elastic sheet.

11. The auxiliary contact system of claim 4, wherein the raised auxiliary movable contact point is riveted to the auxiliary movable elastic sheet and the raised auxiliary static contact point is riveted to the auxiliary static terminal.

12. The auxiliary contact system of claim 4, wherein the auxiliary movable contact has an auxiliary movable terminal.

13. The auxiliary contact system of claim 12, wherein the auxiliary movable elastic sheet is riveted to the auxiliary movable terminal.

14. The auxiliary contact system of claim 13, wherein the auxiliary movable terminal and the auxiliary static terminal are fixed on an inner wall of a housing of the contactor.

15. An auxiliary contact system of a contactor, comprising:

an auxiliary movable contact including an elastic sheet having a raised auxiliary contact point disposed thereon, the elastic sheet extending in a first direction and having a free end defining an extension portion extending beyond the contact point in the first direction;

an auxiliary static contact corresponding to the auxiliary movable contact, the auxiliary static contact extending in the first direction and having a raised auxiliary static contact point corresponding to the raised contact point of the auxiliary movable contact; and a rotation member rotatable between a first position and a second position, in the first position a main movable contact of the contactor is driven by the rotation member to an electric contact position in which the main movable contact contacts a main static contact and the raised auxiliary contact point is in the electric contact position contacting the raised auxiliary static contact point, and in the second position, the main movable contact of the contactor is driven by the rotation member to an electric separation position where the main movable contact is separated from the main static contact and the rotation member engages the extension portion of the elastic sheet of the auxiliary movable contact to the electric separation position separated from the auxiliary static contact.

16. The auxiliary contact system of claim 15, wherein the rotation member engages the extension portion of the elastic sheet at a point above the raised auxiliary contact point in the first direction.

17. The auxiliary contact system of claim 15, wherein, as the rotation member engages the extension portion of the elastic sheet, the rotation member is arranged above the raised auxiliary contact point in the first direction.

18. The auxiliary contact system of claim 15, wherein the rotation member has a pushing portion engaging with the extension portion of the elastic sheet for biasing the auxiliary moveable contact to the electric separation position.

19. The auxiliary contact system of claim 18, wherein the pushing portion extends from the rotation member in a second direction, opposite the first direction.

20. The auxiliary contact system of claim 18, wherein, as the rotation member engages the extension portion of the elastic sheet, the pushing portion remains above raised auxiliary contact point and the raised auxiliary static contact point in the first direction.

* * * * *